United States Patent
Anderson et al.

(10) Patent No.: US 6,609,949 B2
(45) Date of Patent: Aug. 26, 2003

(54) INTERFACE ASSEMBLY FOR LAPPING CONTROL FEEDBACK

(75) Inventors: Bruce Anderson, Minneapolis, MN (US); Dongming Liu, Eden Prairie, MN (US); Edward M. Erickson, Apple Valley, MN (US); Shanlin Hao, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 133 days.

(21) Appl. No.: 09/777,713

(22) Filed: Feb. 6, 2001

(65) Prior Publication Data

US 2001/0049251 A1 Dec. 6, 2001

Related U.S. Application Data

(63) Continuation of application No. PCT/US01/03823, filed on Feb. 6, 2001
(60) Provisional application No. 60/180,522, filed on Feb. 7, 2000.

(51) Int. Cl.$^7$ .................................... B24B 49/00
(52) U.S. Cl. ............ 451/5; 451/8; 451/9; 451/10; 451/279; 29/603.16
(58) Field of Search .................. 451/5, 8, 9, 10, 451/278, 279; 29/603.09, 603.12, 603.16

(56) References Cited

U.S. PATENT DOCUMENTS

| | | | |
|---|---|---|---|
| 4,457,114 A | * 7/1984 | Hennenfent et al. ......... 451/53 |
| 4,536,992 A | 8/1985 | Hennenfent et al. ......... 51/109 |
| 4,914,868 A | 4/1990 | Church et al. ........... 51/165.71 |
| 5,203,119 A | * 4/1993 | Cole ........................... 451/11 |
| 5,175,935 A | 1/1996 | Smith ......................... 33/567 |
| 5,735,036 A | * 4/1998 | Barr et al. ............... 29/603.12 |
| 5,749,769 A | * 5/1998 | Church et al. ................ 451/5 |
| 5,899,793 A | 5/1999 | Yanagida et al. ............. 451/8 |
| 5,951,371 A | * 9/1999 | Hao ........................... 451/28 |
| 5,967,878 A | * 10/1999 | Arcona et al. ................ 451/5 |
| 5,997,381 A | * 12/1999 | Dee et al. ...................... 451/5 |
| 6,045,431 A | * 4/2000 | Cheprasov et al. ............ 451/5 |
| 6,132,290 A | * 10/2000 | Sugiyama et al. ............ 451/10 |

FOREIGN PATENT DOCUMENTS

| DE | 198 15 87 A 1 | 2/1999 |
|---|---|---|
| EP | 0 504 887 A2 | 9/1992 |

\* cited by examiner

Primary Examiner—M. Rachuba
(74) Attorney, Agent, or Firm—Westman, Champlin & Kelly

(57) ABSTRACT

An interfaced carrier assembly including an interface circuit having printed contacts to provide electrical interface or feedback control for lapping operations. The printed contacts are formed on a base material on the interface circuit and interface with terminal pads on a slider bar supported by a carrier plate for lapping feedback control. The interface circuit is assembled with the carrier plate with contacts on the interface circuit aligned with terminal pads on the slider bar supported by the carrier plate. Alignment of the terminal pads on the slider bar and contacts on the interface circuit are measured by digital cameras for assembly of the interfaced carrier assembly.

22 Claims, 10 Drawing Sheets

INTERFACE ASSEMBLY FOR LAPPING CONTROL FEEDBACK

CROSS-REFERENCE TO RELATED APPLICATION

This application claims priority of U.S. Provisional Application No. 60/180,522, filed Feb. 7, 2000 by Bruce Anderson, Dongming Liu, Edward M. Erickson and Shanlin Hao for "WIRLESS LAPPING SENSOR HOOK UP", and is also a continuation of International Application No. PCT/US01/03823, filed on Feb. 6, 2001, published in English, by Seagate Technology LLC for "INTERFACE ASSEMBLY FOR LAPPING CONTROL FEEDBACK", which in turn claims priority of the aforementioned U.S. Provisional Application.

FIELD OF THE INVENTION

The present invention relates to a lapping system for fabricating sliders of a disc drive. In particular, the present invention relates to an interfaced carrier assembly to provide feedback control for lapping operation.

BACKGROUND OF THE INVENTION

Sliders are fabricated on a wafer and rows of sliders are separated from the wafer to form a slider bar. The slider bar includes a plurality of sliders. During the slider fabrication process, the slider is lapped to desired tolerance dimensions using an abrasive lapping surface. The lapping process is controlled using feedback from electronic lapping guides on the slider. In prior lapping systems, feedback from the electronic lapping guides was transmitted via soldered connections on terminals of the electronic lapping guides. Form factor dimensions are decreasing and tolerance control is increasing reducing available spacing for feedback connections to electronic lapping guides. Soldered connections leave a residue and spacing requirements limit the number of feedback connections possible for control of the lapping process. The present invention addresses these and other problems and offers solutions and advantages over the prior art.

SUMMARY OF THE INVENTION

The present invention relates to an interfaced carrier assembly having printed contacts to provide electrical interface or feedback control for lapping operations. The printed contacts are formed on an interface circuit and interface with terminal pads on a slider bar via connection between a carrier plate supporting the slider bar and the interface circuit having the contacts formed thereon. Alignment of the printed contacts on the interface circuit and the terminal pads on the slider bar are measured by digital cameras or imaging device for assembly of the interfaced carrier assembly.

DETAILED DESCRIPTION OF ILLUSTRATIVE EMBODIMENTS

Figure 1:
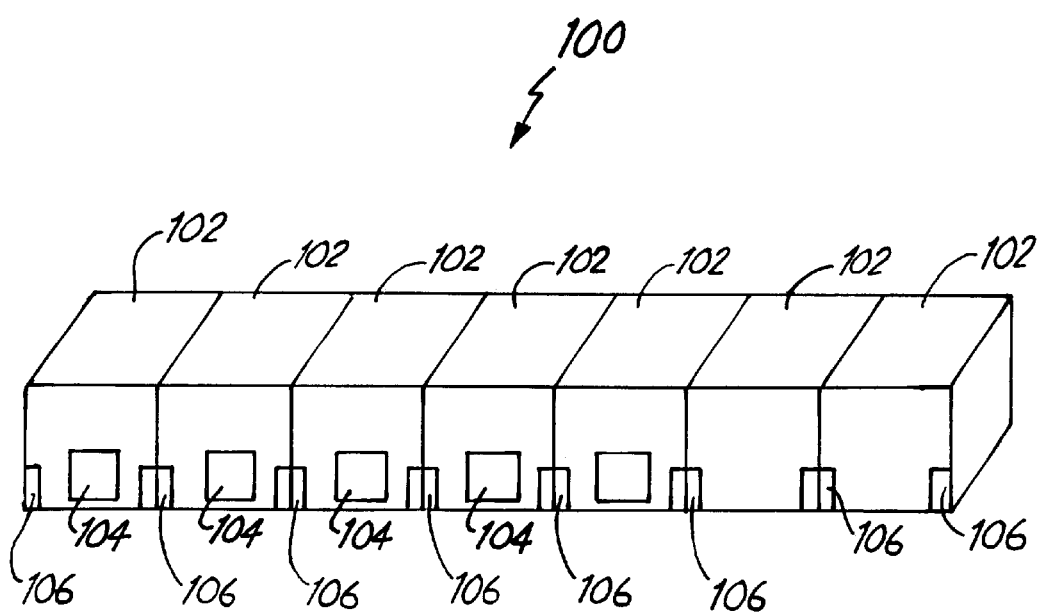
FIG. 1 is diagrammatic view of a slider bar including lapping guides spaced along the slider bar.

Data storage systems use heads to read and/or write data to a data storage medium. Heads include a slider which supports transducer or operating elements, such as magnetoresistive elements (MR) or inductive transducer elements. Sliders are fabricated on a wafer and rows of sliders are separated from the wafer to form a slider bar 100 as shown in FIG. 1. Slider bar 100 includes a plurality of sliders 102 including transducer elements 104 illustrated diagrammatically fabricated on the slider, for example, by a thin film deposition process. Sliders 102 are separated from slider bar 100 to form individual heads of the data storage system.

The slider bar 100 is lapped to form a smooth air bearing surface (ABS) and to provide a desired "throat height" for operation of the transducer elements. The throat height refers to the dimension or separation between the transducer elements and the disc surface. The bar is lapped to provide a desired throat height for optimum electronic and magnetic operating characteristics of the head. The lapping process involves biasing the slider bar 100 against an abrasive lapping surface to remove material from the slider bar 100. The slider bar 100 includes electronic lapping guides (ELG) 106 (illustrated diagrammatically) which are formed on the wafer at the same time that the transducers are deposited. Feedback from the ELGs 106 is used to control the lapping process to lap the slider bar 100 to a desired throat height as will be described.

Figure 2:
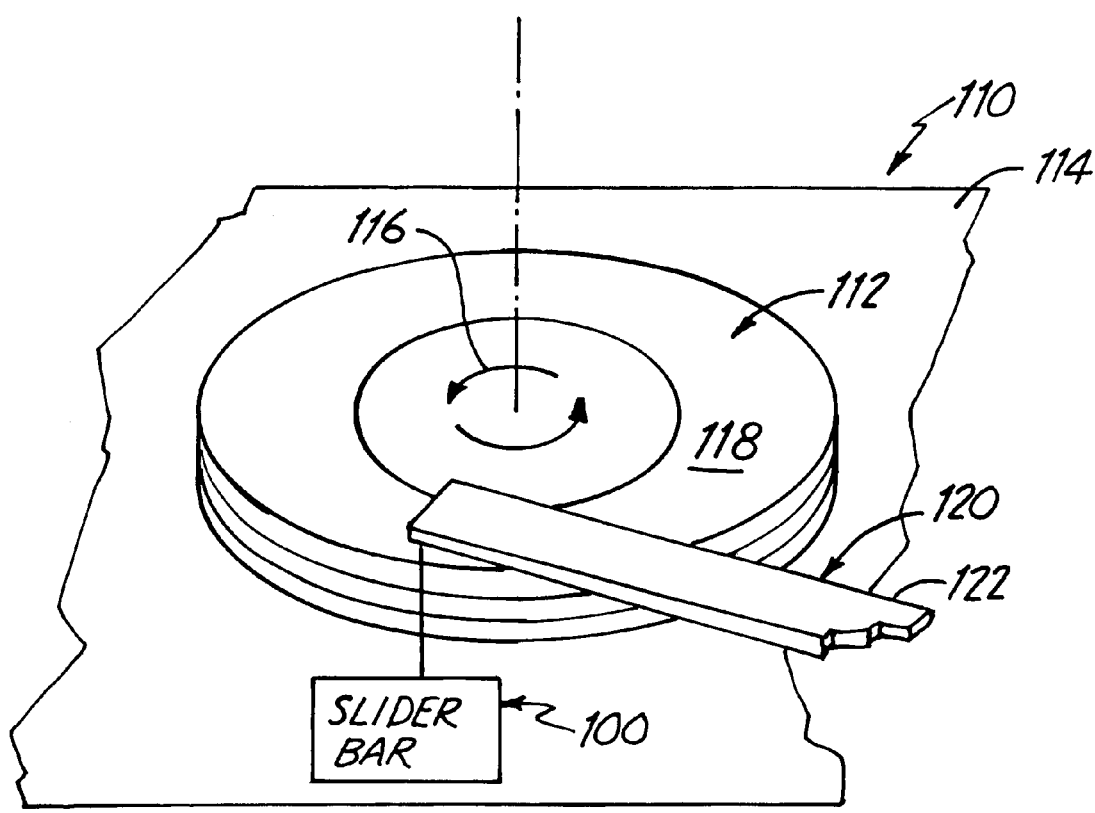
FIG. 2 is an illustrated view of a lapping arm supporting a slider bar relative to a lapping surface for lapping operations.

FIG. 2 illustrates an embodiment of a lapping machine 110 used to lap the slider bar 100. As shown, machine 110 includes a lapping disc 112 rotatably supported on table 114 as illustrated by arrow 116. Lapping disc 112 includes an abrasive or roughened lapping surface 118. The slider bar 100 is supported by an arm assembly 120 against the lapping surface 118 for lapping operation. The arm assembly 120 includes a carrier arm 122 which supports slider bar 100 (illustrated diagrammatically in FIG. 2) against the lapping surface 118 for lapping operation.

Figure 3:
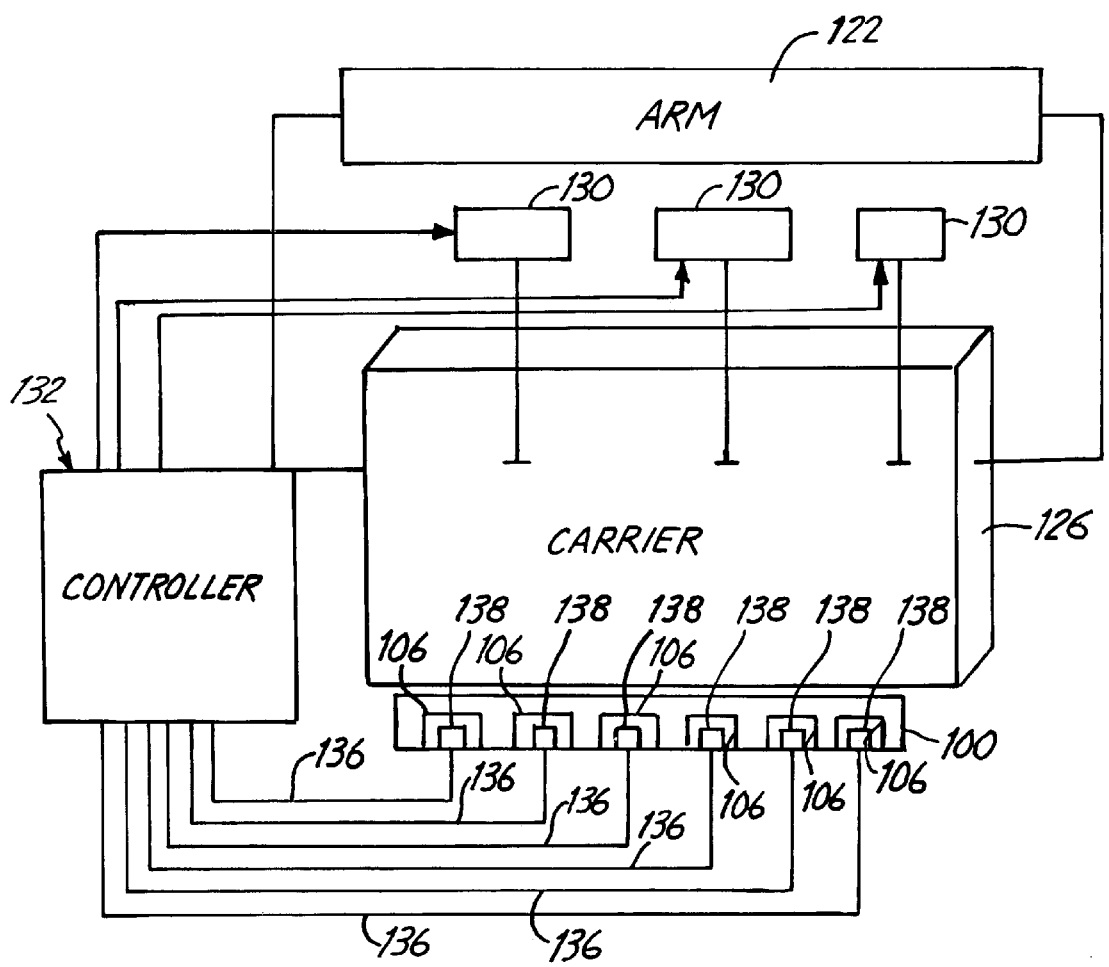
FIG. 3 is a schematic diagram illustrating feedback connections from electronic lapping guides on a slider bar for lapping process control.

As illustrated in FIG. 3, the slider bar 100 is supported by a carrier plate 126 supported by the carrier arm 122 (illustrated diagrammatically). The slider bar 100 can have a curvature or bow induced during fabrication or separation of the bar from the wafer. The curvation or bow of the slider bar 100 can make it difficult to lap the slider bar 100 to the desired throat height along the entire length of the bar. As illustrated in FIG. 3, a plurality of bending actuators 130 illustrated diagrammatically supply a bending force through the carrier plate 126 to adjust the profile of the bar to compensate for curvature or bow along the length of the slider bar 100.

The ELGs 106 spaced along the slider bar measure variations in the curvature or bow of the slider bar 100. A controller 132 controls operation of actuators 130 based upon feedback from the ELGs 106 spaced along the slider bar 100, to supply sufficient force to the slider bar 100 at actuated control points, along the carrier plate 126 to compensate for the curvature or bow of the slider bar 100. Feedback from the ELGs 106 is provided to the controller 132 as shown diagrammatically in FIG. 3 to operate actuators 130 to activate the actuated control points along the length of the slider bar 100.

As schematically shown in FIG. 3, leads 136 operably connect ELGs 106 to controller 134. In prior applications leads were soldered to ELG terminals 138 (illustrated diagrammatically) on the slider bar. The soldered lead connections are difficult to completely remove without residue. Head form factor size is decreasing requiring greater tolerance or manufacturing control over the slider or head components. Lapping processes have developed which increase the number of actuated controls points along the slider bar to improve tolerance control for the lapping process. These processes require an increased number of feedback connections to control the increased number of actuated control points. The increased number of feedback connections makes it more difficult to electrically interface each of the ELG terminals 138 on the slider bar 100 to control circuitry or controller 132 of the lapping device because of the close spacing required between ELG terminals 138 and decreased spacing available for electrical interface. The present invention provides a solution to these and other problems and provides advantages not previously recognized.

Figure 4:
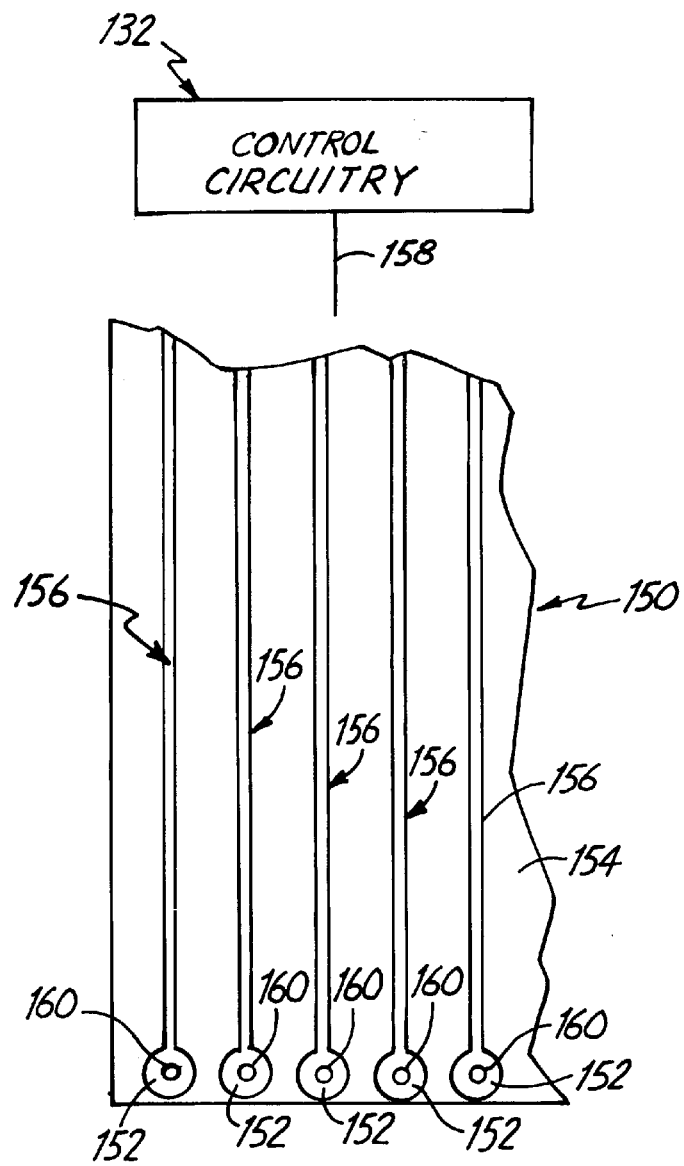
FIG. 4 is an illustration of an embodiment of an interface circuit of the present invention for providing feedback for lapping operation control.
Figure 5:
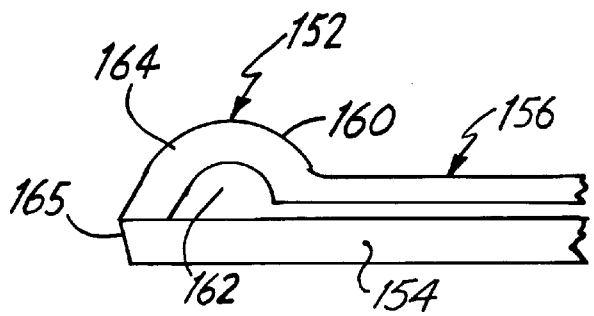
FIG. 5 is a detailed elevational view of an embodiment of a printed contact of the interface circuit of FIG. 4.

The present invention includes a printed interface circuit 150 to electrically couple ELGs 106 or feedback elements to control circuitry of the lapping device as illustrated in FIG. 4. The printed interface circuit 150 includes printed contacts 152 fabricated on a base 154. Contacts 152 are conductively coupled to conductive paths 156 which electrically couple to control circuitry 132 as illustrated schematically by line 158. As shown in FIG. 5, the printed contacts 152 are formed of a dome-shaped bump 160 deposited on base 154 by known printing techniques such as etching or masking techniques. The spacing and dimensions of the bump 160 is relatively small to provide a relatively large number of ELG 106 connections along the length of the slider bar.

In the illustrated embodiment, the base 154 is formed of a flexible material such as a polyimide material. In the embodiment shown in FIG. 5, the bump 160 is formed of a composite structure using a multi-step printing fabrication process. Fabricated bump circuits, as described, are available from Packard Hughes of Irvine, Calif. The closely spaced bumps 160 provide an electrical interface for increased feedback control along the length of the slider bar. The composite bump structure 160 includes a conductive base layer 162 formed of copper alloy or other conductive material and an upper plating layer 164 of gold or other conductive corrosion-resistant material. Conductive paths 156 are formed of a similar composite structure including a copper base layer 162 and a gold plating layer 164. As shown, bump 152 is formed proximate to an edge surface 165 of base 154 which as shown in FIG. 5 is inclined at an angle relative to a sloped surface of bumps 152 to limit interference during lapping operations so that edge surface 165 does not contact or touch the lapping surface 118.

For lapping operation, contacts 152 on the interface circuit 150 are aligned with terminal pads 138 on the slider bar 100 supported on carrier plate 126 to provide the desired electrical interface for lapping control. The printed contacts 152 provide electrical interfaces between a plurality of terminal pads 138 without solder residue or interference. Further, the printed structure provides a small contact dimension to increase the number of contacts which can be spaced along the length of a form factor slider bar 100 and provides tighter tolerance control to provide the desired number of electrical connections between closely spaced terminal pads 138.

Figure 6:
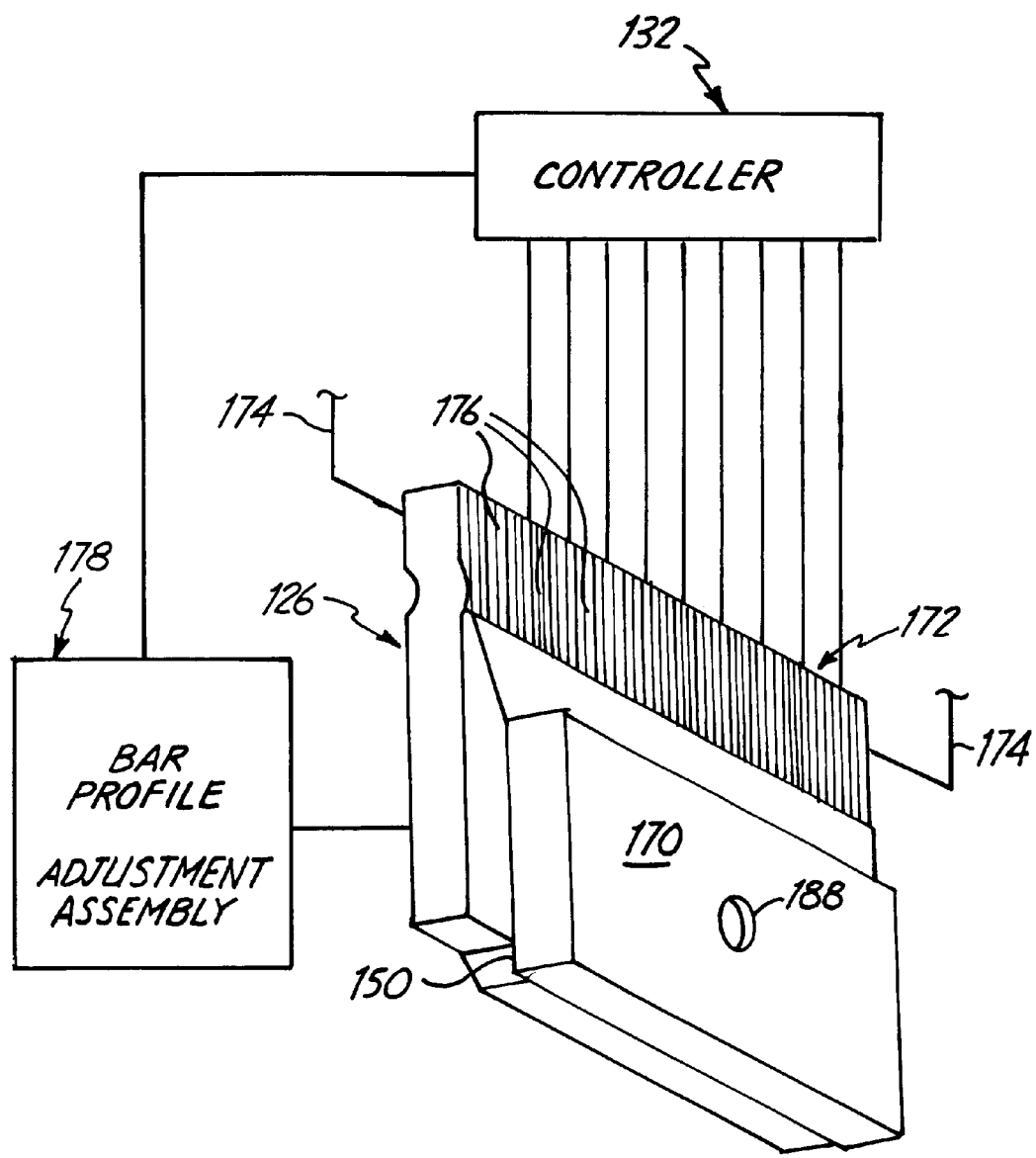
FIG. 6 is an illustrated view of an embodiment of a interfaced carrier assembly including a backing plate for providing feedback for lapping operation control.

As shown in FIG. 6, the interface circuit 150 is adhesively assembled to carrier plate 126 (supporting a slider bar 100) with the contacts 152 aligned with terminal pads 138 on the slider bar 100 to form an interfaced carrier assembly for lapping operations. In the embodiment shown, a backing plate 170 is assembled with the carrier plate 126 and interface circuit 150 so that the interface circuit 150 is supported between the carrier plate 126 and the backing plate 170. The interfaced carrier backing plate assembly 172 is supported by arm 122 as illustrated schematically by lines 174 in FIG. 6 for lapping operations. As shown, interface circuit 150 includes a plurality of interface terminals 176 to electrically couple feedback signals from ELGs 106 to controller 132. The controller 132 operates a bar profile adjustment assembly 178 (illustrated schematically) operating a plurality of actuators 130 to provide profile adjustments to the carrier plate 126 for multi-point actuated bending control to compensate for curvature or bow of the slider bar 100.

Figure 7:
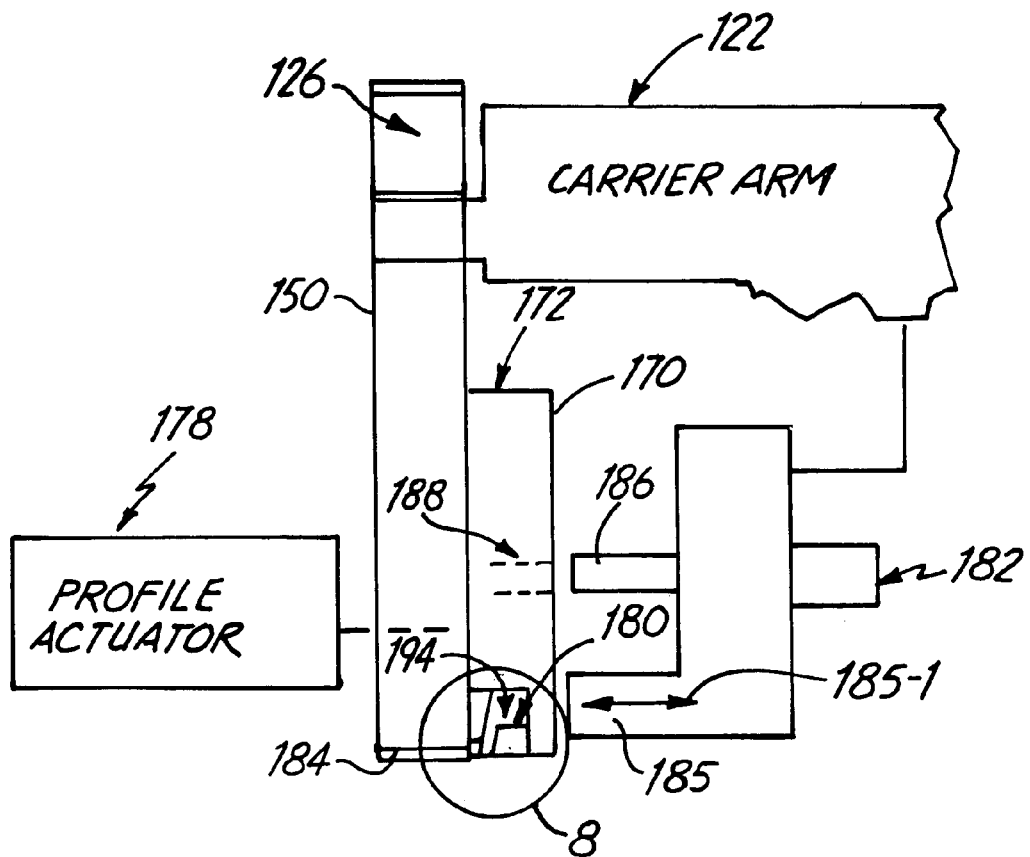
FIG. 7 is a side view of an embodiment of an interfaced carrier assembly coupled to a backing plate of the present invention.
Figure 8:
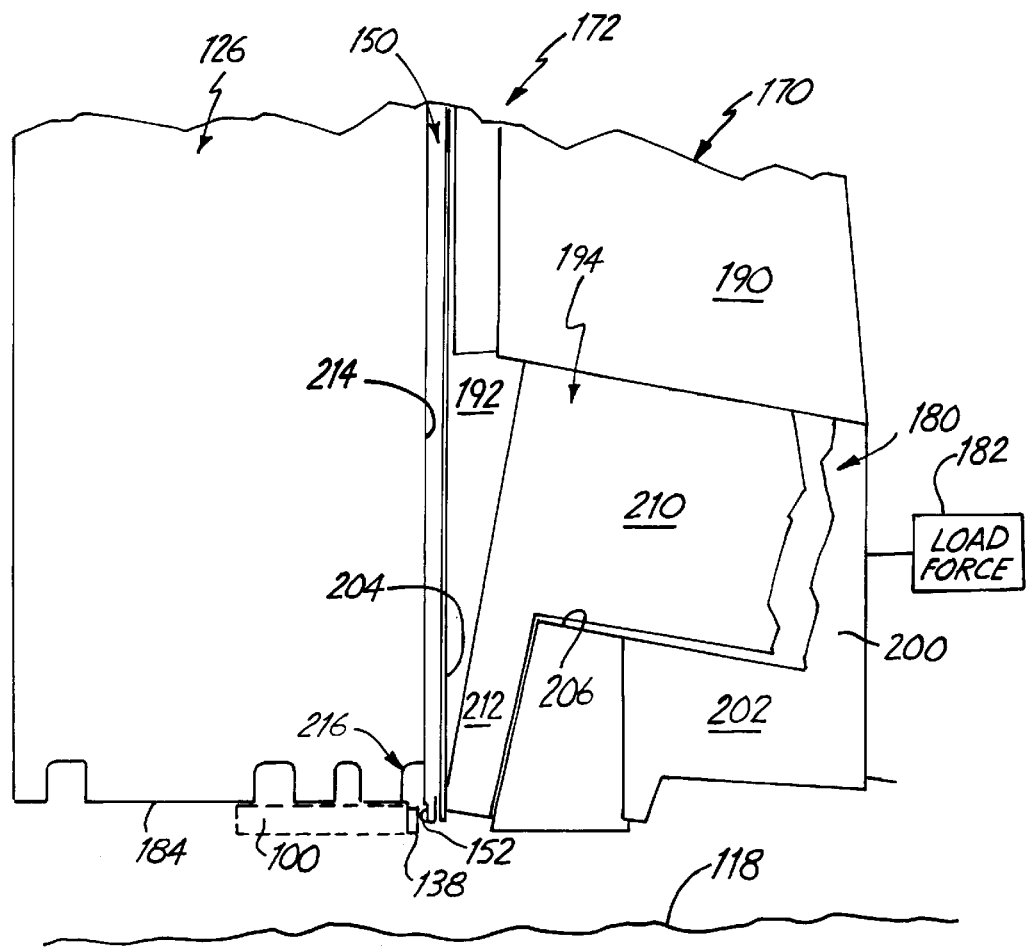
FIG. 8 is a detailed view of portion 8 of FIG. 7.

As illustrated in FIGS. 7–8, the backing plate 170 includes a tip portion 180 which is aligned with contacts 152 on the interface circuit 150 as shown more clearly in FIG. 8. A load actuator 182 is operably coupled to the tip portion of backing plate 170 and is adapted to supply a load force to the tip portion 180 to bias contacts 152 through a compressible load interface 183 on the interface circuit 150 against terminal pads 138 on a slider bar 100 supported on a lower surface 184 of the carrier plate 126. As shown in FIG. 7, load actuator 182 includes a load plunger 185 which is aligned relative to the tip portion of backing plate and which moves between a retracted position and a forward position as illustrated by arrow 185-1.

In the forward position, load plunger 185 biases tip portion 180 towards contacts 152 on the interface circuit 150 to bias the contact 152 against terminal pads 138 on the slider bar 100. An alignment pin 186 seats in a pin hole 188 (shown also in FIG. 6) to align actuator 182 with tip portion 180 to bias contacts 152 against terminal pads 138 for feedback control. Upon completion of the lapping process, load pressure or the load force from actuator 182 is released to release contacts 152 from terminal pads 138 to remove the slider bar 100 from the carrier plate 126 for assembly in a data storage device.

FIG. 8 is a detailed view of an embodiment of the interfaced carrier backing plate assembly 172 having an interface circuit 150 supported relative to the carrier plate 126 and having contacts 152 which are selectively biased against terminal pads 138 on a slider bar 100. The interface circuit 150 is secured between a main body portion 190 of the backing plate 170 and the carrier plate 126. The tip portion 180 of the backing plate 170 is separated from interface circuit 150 and forms a cavity 192 between the interface circuit 150 and the tip portion 180. A compressible member 194 is supported in the cavity 192 so that the tip portion 180 and compressible member 194 provide a load interface between actuator 182 and the interface circuit 150 to bias contacts 152 against terminal pads 138. Thus, load force from actuator 182 is transferred through tip portion 180 of backing plate 170 and compressible member 194 to bias contacts 152 against terminals 138 on the slider bar 100.

In the embodiment shown in FIG. 8, tip portion 180 of backing plate 170 includes a leg 200 supported relative to the main body portion 190 and a foot portion 202 extending from leg 200 in alignment relative to contacts 152 on the interface circuit 150. A face of leg 200 is recessed from the foot 200 to form a stepped shaped for cavity 192 having a first cavity portion 204 between the foot 202 and interface circuit 150 and a stepped recessed cavity portion 206 between the recessed leg 200 and the interface circuit 150.

As shown, compressible member 194 is formed of a generally "L" shaped member having a base portion 210 and an interface portion 212. Base portion 210 is supported in the recessed cavity portion 206 and floatably supports interface portion 212 in alignment between the foot 202 of backing plate 170 and interface circuit 150 to provide a compressible interface between the tip portion 180 of the backing plate 170 and the interface circuit 150. The base portion 210 of the compressible member 194 floatably supports the interface portion 212 without adhesive connection to allow the interface portion 212 to compress or deform depending upon the dimension of a gap between the contacts 152 on the interface circuit 150 and the terminal pads 138 on the slider bar 100 and forward position of foot 202.

In the embodiment described, the compressible member 194 is formed of an elastomeric material which is deformed without constraint of an adhesive connection to provide an elastic interface between the tip portion 180 of the backing plate 170 to bias interface contacts 152 against the terminal pads 138 on the slider bar 100. In the embodiment shown, the recessed stepped cavity portion 206 is angled or sloped downward from an opening thereto so that the base portion 210 of the compressible member 194 is floatably retained therein during lapping operation.

In the embodiment shown, interface circuit 150 is secured to the carrier plate 126 along a face surface 214 to support contacts 152 in alignment with terminals 138 on slider bar 100 supported on lower surface 184 of the carrier plate 126. In the embodiment shown in FIG. 8, a tip portion of face surface 214 includes a notch 216 to provide clearance for a tip portion of the interface circuit 150 for placement of contacts 152 proximate to terminals 138 on the slider bar 100. In particular, in the embodiment shown, a trailing edge of the slider bar 100 extends beyond the notch surface 216 to provide clearance for interface of contacts 152 on the interface circuit 150 with terminals 138 on the slider bar 100 to limit stress contact points for the interface circuit 150 against the carrier plate 126.

Figure 9:
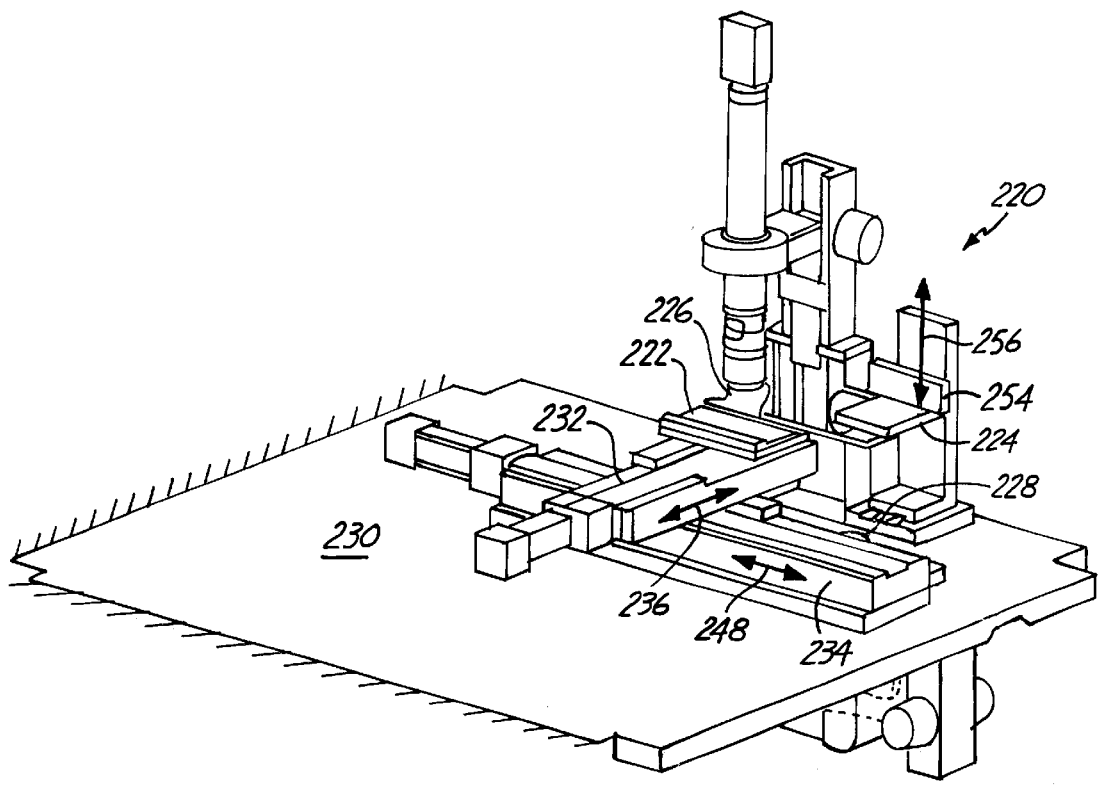
FIG. 9 is a perspective view of an embodiment of an assembly apparatus for alignment and assembly of the interfaced carrier assembly of the present invention.

For operation, the contacts 152 on interface circuit 150 must be accurately aligned or positioned relative terminals 138 of the slider bar 100 supported on the carrier plate 126 for proper control feedback. Alignment shifts during lapping operation can degrade feedback for desired precision lapping control. The increased number of feedback connection increases the alignment precision required for proper feedback control. FIG. 9 illustrates an assembly device 220 for aligning components of the interfaced carrier assembly of the present invention.

As shown, assembly device 220 includes opposed first and second component platforms 222, 224 and first and second optical alignment cameras 226, 228 which are supported relative to table 230. Cameras 226, 228 are positioned to measure alignment of terminal pads 138 on the slider bar 100 supported on the carrier plate 126 and contacts 152 on the interface circuit 150. The interface circuit 150 is pre-assembled to a backing plate 170 to form a load interface assembly. The interface circuit 150 is pre-assembled to the backing plate 170 by an adhesive layer connecting the interface circuit 150 to the backing plate 170.

The carrier plate 126 and slider bar 100 and load interface assembly are supported on platforms 226 228 with terminals 138 on the slider bar 100 and contacts 152 on the load interface assembly facing cameras 226, 228, respectively, to measure alignment. Cameras 226, 228 are charged coupled devices (CCD) or digital imaging devices which are configured to extract a digital image of the terminal pads 138 and contacts 152. The extracted digital image is processed to determine alignment of the terminal pads 138 and contacts 152 on the carrier plate 126 and interface circuit 150 relative to a reference position for assembly alignment.

Figure 10:
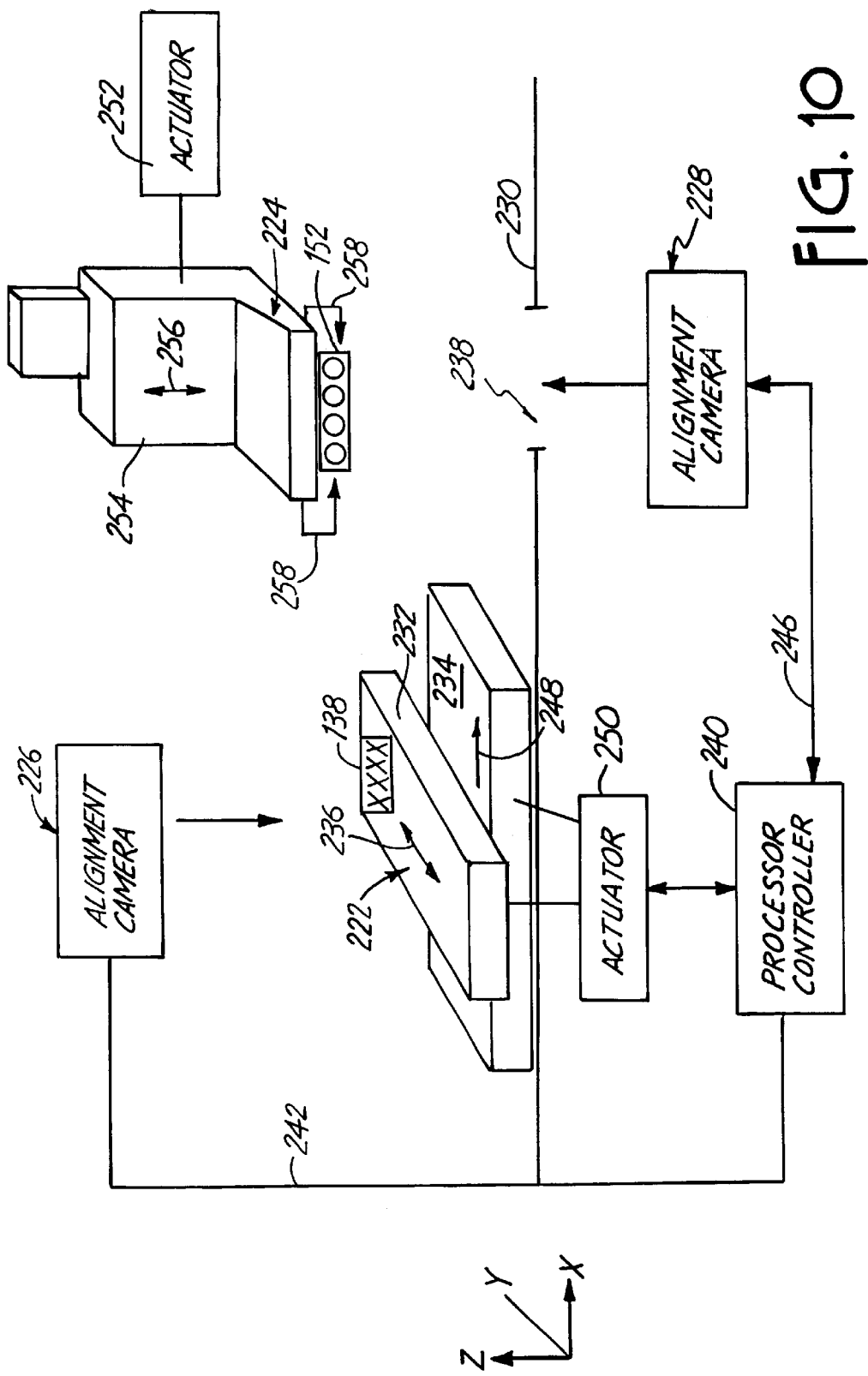
FIGS. 10–11 schematically illustrate operation of the assembly apparatus of FIG. 9.
Figure 11:
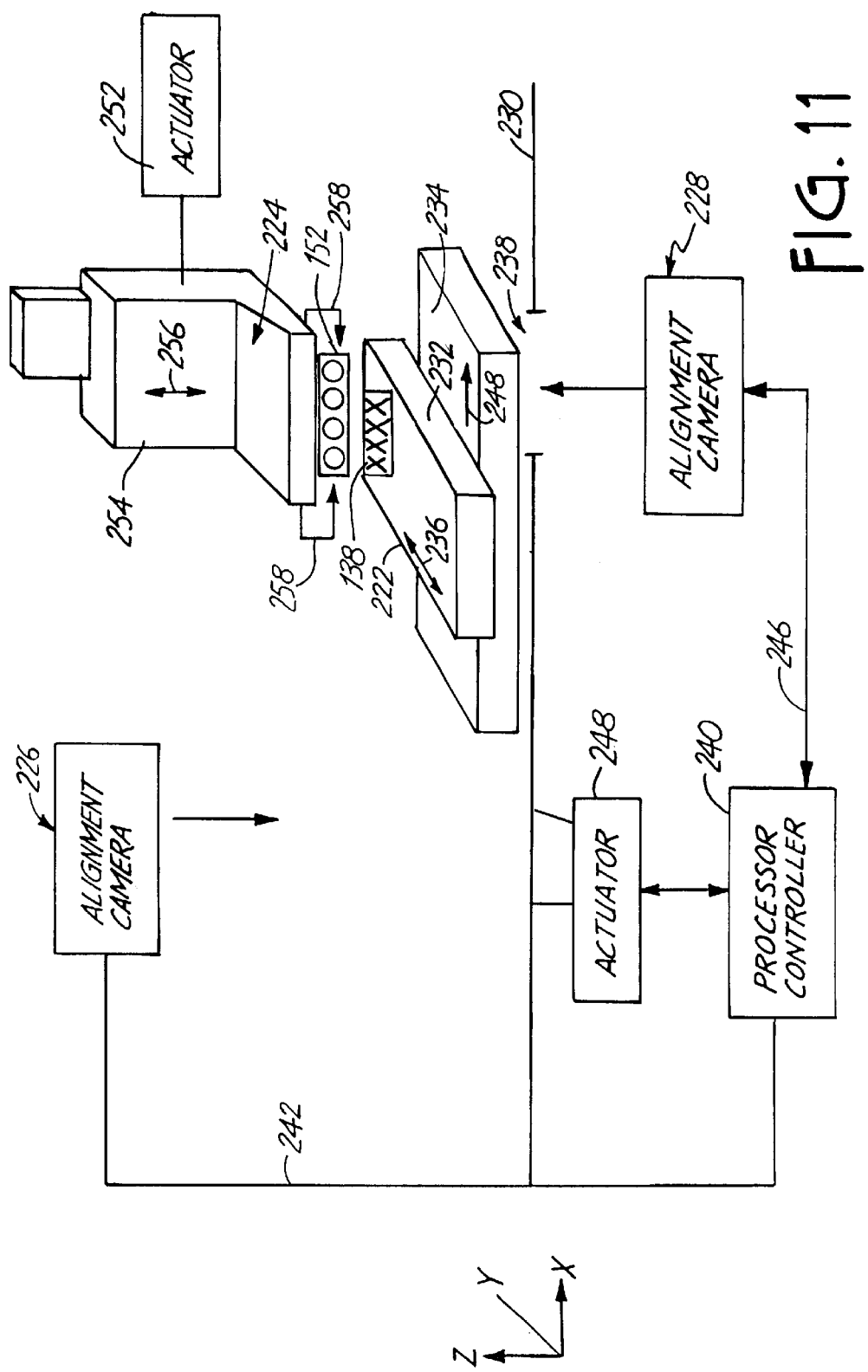

In the embodiment shown in FIGS. 9–11, carrier plate 126 is supported on first platform 222 facing in a first upward direction toward a downwardly facing camera 226 to measure alignment of the terminals 138 on the slider bar 100 and the load interface assembly is supported on the second platform 228 with the interface contacts 152 facing in an opposed second downward direction toward an upwardly facing camera 228 to measure alignment of interface contacts 152. The measured alignment of the terminal pads 138 and contacts 150 is used to align the carrier plate 126 and load interface assembly to assemble the interfaced carrier assembly 172 for connection to a carrier arm 122 for lapping operations. Once alignment is measured, platforms 222, 224 are positioned in opposed relation with terminal pads 130 on the carrier plate 126 aligned with contacts 152 on the load interface assembly to adhesively assemble the carrier plate 126 to the interface circuit 150 to form the interfaced carrier assembly accurately aligned for lapping operations.

In the embodiment shown in FIG. 9 and schematically in FIGS. 10–11, platform 222 is supported on a first longitudinal slide 232 which is coupled to a lateral slide 234 (movable along an x-axis) and movable therewith for assembly. Slide 232 is adjusted as illustrated by arrow 236 to position carrier plate 126 under camera 226 to measure alignment. In the illustrated embodiment, the x-y position of platform 224 is fixed, and camera 228 measures alignment of contacts 152 through opening 236 in table 230—not visible in FIG. 9. The measured alignment is provided to a processor or controller 240 as illustrated by lines 242, 246 and is used to control the distance lateral slide 234 is moved along the x-axis as illustrated by arrow 248 for alignment of terminal pads 138 on carrier plate 126 with contacts 152 on the load interface assembly.

Slide 234 is moved by actuator 250 under operation of controller 240 based upon alignment feedback from cameras 226, 228. Once slide 234 aligns carrier plate 126 with contacts 152 on the load interface assembly as illustrated in FIG. 11, actuator 252 operates a slide 254 to lower platform 224 along the z-axis (as illustrated by arrow 256) toward platform 222 to assemble the interfaced carrier assembly for lapping operations. In the embodiment shown, the load interface assembly is secured to platform 224 for assembly operations via arms 258. Arms 258 release the load interface assembly upon completion of the assembly process for the interfaced carrier assembly. Although in the embodiment described carrier plate 126 is supported on a movable platform, it should be understood that application is not limited to the specific embodiment shown and that either or both the carrier plate 126 or load interface assembly can be supported on a movable platform for assembly.

Carrier plate is pre-assembled with an adhesive layer on face surface 214 and the interface circuit 150 of the load interface assembly is biased against the adhesive layer of the carrier plate 126 via operation of slide 254 to adhesively secure the interfaced carrier assembly for lapping operation. As described, the assembly device uses cameras to align printed contacts 152 with terminal pads 138 on a slider bar 100 to provide increased interface capacity for increased lapping control resolution. In the embodiment described, the pre-assembled interfaced carrier assembly includes a carrier plate and interface circuit assembled with a backing plate by multiple adhesive layers to form a composite assembly. The composite interfaced carrier assembly is assembled to the carrier arm 122 for lapping without extensive assembly calibration of the lapping machine to assure alignment of contacts 152 and terminal pads 138 for reduced operating complexity and maintenance.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive, it will be appreciated by those skilled in the art that the teachings of the present invention can be applied to other systems, like optical or magneto-optical systems, without departing from the scope and spirit of the present invention.

What is claimed is:

1. In combination:
   a carrier plate adapted to support a slider bar mounted on the carrier plate having a plurality of feedback terminals spaced therealong;
   an interface circuit including a circuit base having a plurality of conductive paths thereon and opposed first and second surfaces;
   an adhesive layer between the first surface of the interface circuit and the carrier plate to adhesively connect the first surface of the interface circuit relative to the carrier plate; and
   a plurality of contacts spaced along the first surface of the interface circuit and the plurality of contacts conductively coupled to the plurality of conductive paths and aligned relative to the plurality of feedback terminals on the slider bar to form an integral wireless electrical interface between the plurality of feedback terminals of the slider bar and the plurality of conductive paths.

2. The combination of claim 1 wherein the plurality of contacts are formed of a gold plated copper composition.

3. The combination of claim 1 wherein the circuit base is formed of a flexible material.

4. The combination of claim 1 and further comprising:
   a backing plate; and
   an adhesive layer connecting the backing plate to the second surface of the interface circuit.

5. The combination of claim 1 and further comprising:
   a load device adapted to supply a load force to bias the plurality of contacts on the interface circuit toward the plurality of feedback terminals of the slider bar supported on the carrier plate.

6. The combination of claim 4 wherein the backing plate includes a tip portion and further comprising: a compressible member interposed between the tip portion of the backing plate and a portion of the interface circuit.

7. The combination of claim 6 wherein the compressible member is formed of an elastomeric member.

8. The combination of claim 6 wherein the compressible member comprises:
   a base portion floatably supported in a stepped recessed cavity of the backing plate; and
   an interface portion interposed between the tip portion of the backing plate and the interface circuit.

9. The combination of claim 8 wherein the tip portion of the backing plate includes a leg portion extending from a main body portion of the backing plate and a foot portion extending from the leg portion and an interface between the leg portion and the foot portion forms the stepped recessed cavity to floatably support the base portion of the compressible member therein.

10. The combination of claim 9 wherein the stepped recessed cavity is inclined to retain the base portion of the compressible member therein.

11. The combination of claim 6 and further including an actuator including a plunger operable between a recessed position and a forward position and adapted to abut the tip portion of the backing plate to supply a load force to bias the plurality of printed contacts against the plurality of feedback terminals on the supported slider bar.

12. In combination:
   a carrier plate adapted to support a slider bar for lapping operation including a plurality of feedback terminals;
   an interface circuit including a plurality of contacts coupled to a plurality of conductive paths; and
   interfacing means for connecting the carrier plate and the interface circuit to provide an electrical interface between the feedback terminals on the slider bar and the plurality of contacts coupled to the plurality of conductive paths on the interface circuit.

13. A control method for lapping operation comprising steps of:
   providing a carrier plate supporting a slider bar having a plurality of feedback terminals;
   providing an interface circuit having a plurality of contacts;
   measuring alignment of the plurality of feedback terminals on the slider bar and the plurality of contacts on the interface circuit using a digital imaging device; and
   assembling the interface circuit relative to the carrier plate based upon the measured alignment of the plurality of feedback terminals on the slider bar and the plurality of contacts on the interface circuit.

14. The method of claim 13 and the step of assembling the interface circuit relative to the carrier plate comprises:
   adhesively connecting the interface circuit to the carrier plate after the plurality of feedback terminals on the slider bar and the plurality of contacts on the interface circuit are aligned for assembly on a lapping arm relative to a lapping surface.

15. The method of claim 13 wherein the carrier plate is supported on a first platform aligned with a first imaging device orientated in a first direction and the interface circuit is supported on a second platform longitudinally spaced from the first platform and aligned with a second imaging device orientated in a second direction and the step of assembling the interface circuit relative to the carrier plate based upon the measured alignment comprises the step of:

moving at least one of the first or second platforms to align the plurality of feedback terminals on the slider bar with the plurality of contacts on the interface circuit based upon the measured alignment.

16. The method of claim 15 wherein the interface circuit is preassembled with a backing plate and the interface circuit and the backing plate are supported on the second platform.

17. The method of claim 16 wherein the step of assembling the interface circuit relative to the carrier plate further comprises a step of:

moving the first and second platforms so that the carrier plate abuts the interface circuit to assembly the carrier plate with the interface circuit and backing plate.

18. The method of claim 17 and further comprising the step of:

removing the assembled carrier plate and interface circuit from the first or second platforms and loading the assembled carrier plate and interface circuit onto a lapping arm of a lapping device.

19. The method of claim 18 and further comprising the step of:

supplying a load force to the backing plate to bias the plurality of contacts on the interface circuit toward the plurality of feedback terminals on the slider bar.

20. A carrier assembly for a slider bar farmed of the method of claim 13.

21. The combination of claim 1 wherein the carrier plate includes a notch along an end portion and the plurality of contacts are formed along a tip portion of the interface circuit aligned with the notch along the end portion of the carrier plate.

22. The combination of claim 1 wherein the plurality of contacts are formed along a tip portion of the interface circuit and the tip portion of the interface circuit includes a sloped edge along the tip portion of the interface circuit.

* * * * *

UNITED STATES PATENT AND TRADEMARK OFFICE
CERTIFICATE OF CORRECTION

PATENT NO. : 6,609,949 B2
DATED : August 26, 2003
INVENTOR(S) : Anderson et al.

It is certified that error appears in the above-identified patent and that said Letters Patent is hereby corrected as shown below:

<u>Title page,</u>
Item [56], References Cited, delete "5,175,935 A, 1/1996" and insert
-- 5,175,938, 1/1993 --.

<u>Column 8,</u>
Line 27, after "of" delete "printed".

<u>Column 9,</u>
Line 11, insert -- at least one of -- after "moving".
Line 12, change "assembly" to -- assemble --.
Line 13, insert -- the -- after "and".

Signed and Sealed this

Twentieth Day of April, 2004

JON W. DUDAS
*Acting Director of the United States Patent and Trademark Office*